United States Patent [19]

Müller

[11] 4,157,305

[45] Jun. 5, 1979

[54] METHOD OF FILTERING MOLTEN COAL

[75] Inventor: Hans Müller, Erlenbach, Switzerland

[73] Assignee: Chemap AG, Maennedorf, Switzerland

[21] Appl. No.: 856,598

[22] Filed: Dec. 1, 1977

Related U.S. Application Data

[63] Continuation-in-part of Ser. No. 696,589, Jun. 16, 1976, abandoned.

[30] Foreign Application Priority Data

Jun. 20, 1975 [CH] Switzerland .......................... 8106/75

[51] Int. Cl.$^2$ ............................................ B01D 41/00
[52] U.S. Cl. ........................................ 210/42 S; 210/67;
210/68; 210/75; 210/76; 208/8 LE
[58] Field of Search ...................... 208/8, 8 LE, 177;
210/67, 68, 69, 73 R, 70, 75, 76, 173, 193, 223,
500 R, 503, 79, 81, 42 S

[56] References Cited

U.S. PATENT DOCUMENTS

| | | | |
|---|---|---|---|
| 1,112,976 | 10/1914 | Burks | 210/500 R |
| 1,830,962 | 11/1931 | Read | 210/75 |
| 1,864,856 | 6/1932 | Pier et al. | 208/8 |
| 1,874,972 | 8/1932 | Hall | 210/75 |
| 2,385,431 | 9/1945 | Vose | 210/223 |
| 2,537,759 | 1/1951 | Hersberger | 210/75 |
| 2,579,946 | 12/1951 | McClain | 210/75 |
| 3,138,551 | 6/1964 | Jones | 210/503 |
| 3,190,449 | 6/1965 | Muller | 210/173 |
| 3,233,734 | 2/1966 | Muller | 210/68 |
| 3,341,447 | 9/1967 | Bull | 208/8 |
| 3,349,918 | 10/1967 | Yasuhiko | 210/223 |
| 3,550,774 | 12/1970 | Hirs | 210/73 R |
| 3,808,119 | 4/1974 | Bull et al. | 208/8 |
| 3,870,632 | 3/1975 | Erskine | 210/67 |
| 3,890,224 | 6/1975 | Weiss | 210/223 |
| 4,046,690 | 9/1977 | Rodgers | 210/75 |

FOREIGN PATENT DOCUMENTS

| | | | |
|---|---|---|---|
| 291778 | 7/1967 | Australia | 210/193 |
| 311197 | 4/1929 | United Kingdom | 210/75 |
| 617860 | 2/1949 | United Kingdom | 210/500 |

OTHER PUBLICATIONS

Hackh's Chemical Dictionary, McGraw-Hill Book Company, 1969, 615.

Primary Examiner—Charles N. Hart
Assistant Examiner—Ernest G. Therkorn
Attorney, Agent, or Firm—Michael J. Striker

[57] ABSTRACT

A process for filtering molten coal is provided. The process comprises the steps of providing a filter, passing a stream of molten coal which includes some solid material against said filter and filtering the solid material so as to form a filter cake on and to pass a filtrate through said filter, directing a stream of inert gas against said filter cake so as to dry the same to a predetermined low moisture content, centrifuging said dried filter cake off said filter, separating from the filter cake a fraction composed of fine particles, adding said separated fine particles to a stream of molten coal upstream of said filter, and passing said stream of molten coal and separated fine particles against said filter, whereby said fine particles act as a filter aid for the filtration of the molten coal. The process can also comprise adding calcium oxide or an inorganic salt to a stream of molten coal whereby the added compound acts as a filter aid, and subsequently recovering the added compound and again adding it to a stream of another coal.

11 Claims, 2 Drawing Figures

METHOD OF FILTERING MOLTEN COAL

BACKGROUND OF THE INVENTION

This application is a continuation-in-part of applicant's parent application Ser. No. 696,589, filed June 16, 1976, now abandoned.

The invention relates generally to filtration and to the filter aids used therefor. Of particular interest to the invention is the filtration of the sludge obtained from the hydrogenation of coal under pressure.

The depletion of the earth's reserves of crude oil and petroleum has again generated interest in the hydrogenation of coal. The methods used for the hydrogenation of coal generally use bituminous coal as a starting material. The bituminous coal is first dried and then crushed or ground. Thereafter, a slurry of the coal in oil is formed. The coal-oil slurry is exposed to hydrogen under conditions of high pressure and elevated temperature with the heat of reaction which results from the hydrogenation being conveyed away by means of cold water. The hydrogenation yields a sludge phase or molten coal which must be filtered.

The separation of the solids, that is, the impurities such as silicates, rocks, earth and unreacted coal, from the molten coal constitutes a major step in the manufacture of products from the molten coal. Very large drum filters or very large rotary vacuum filters are generally used for this separation; due to their size, these filters take up large amounts of space in the production facilities.

The filtration is normally carried out using an expensive filter aid; enormous quantities of the filter aid are required because after the filtration the filter aid is deposited in heaps together with the remainder of the filter cake. This waste of the filter aid makes the entire process very uneconomical. The residues yielded contain approximately 40 percent dry matter [O. Berger; Chemical and Process Engineering, page 617, November 1965; also, G. W. Ibing, Erdol and Kohle, volume 28, number 3, page 143 (1975)].

As already indicated, large amounts of a filter aid which are not regenerated are utilized during the hydrogenation of coal. The filter aids conventionally used during the hydrogenation of coal are kieselguhr and perlite which are very expensive. Other cheaper filter aids such as cellulose, wood pulp and various synthetic plastics cannot be used because of their susceptibility to heat.

A common technique for recycling diatomaceous earth filters such as kieselguhr involves taking advantage of their non-combustible nature by burning the filter cake. Although recovery of these expensive filters at least in part is certainly desirable, combustion of the filter cake for this purpose is unsuitable since large quantities of ashes are mixed with the non-combustible filter aid.

SUMMARY OF THE INVENTION

An object of the invention is to provide a filtering method which enables solid matter to be economically separated from molten coal.

This object and others which will become apparent hereafter are achieved in accordance with the invention. One aspect of the invention is a method of filtering molten coal, that is, coal which is in flowable state, with a filter aid. At least a portion of this filter aid is recovered from the resulting filter cake and the recovered filter aid is recycled for use in filtering the molten coal.

The filter aids used to filter the molten coal in accordance with the invention are not the expensive diatomaceous earths which are not readily recoverable from a filter cake derived by filtration of the molten coal. Instead, the invention involves the use of cheaper filter aids which are readily recoverable from such a filter cake. Filter aids which may be used in accordance with the invention involve:

1. fine particles of slag derived from the solid material which remains unmelted while the rest of the coal mixture melts in the oil slurry; and/or
2. compounds added to the stream of molten coal and being readily recoverable therefrom by techniques such as pneumatic classification, magnetic separation and solvent separation—such compounds include calcium oxide, inorganic salts and magnetic metal granulates.

The concept of using as a filter aid solid particles which originate in the subsequently liquefied coal mixture, is a particularly economical solution to the conventional disadvantages of filtering molten coal. Only the fine particles present in the solid material are used as a filter aid in accordance with this inventive concept. Therefore, the solid material is deposited as a filter cake on a centrifuged discharge filter. Then the filter cake is successively dried with a chemically unreactive gas to a predetermined low moisture content of 0.5 to 3% by weight. This drying minimizes agglomeration of the particles of the filter cake. At this point, the particles are separated according to size. The larger particles are collected and discarded; the fine particles are collected and added to the stream of molten coal upstream of the filter.

This concept of deriving the filter aid from the material composing the molten coal stream requires initially the formation of a first filter cake before fine particles can be recovered. To obtain this first filter cake, recoverable compounds such as calcium oxide, inorganic salts and magnetic metal granulates may be added to the molten coal stream. These added compounds act as initial filter aids and can be recovered as the fine solid particles of the coal mixture are isolated. These added compounds and/or the fine coal mixture particles can then be added to the incoming stream of molten coal upstream of the centrifugal discharge filter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

In a preferred aspect, the invention relates to a method of filtering the molten coal or crude sludge obtained during the destructive hydrogenation of coal.

Also disclosed herein is the use of special filter aids for the filtration of the molten coal or crude sludge obtained during the destructive hydrogenation of coal.

According to the invention, the molten coal is filtered using a filter aid and at least a portion of the latter is recovered from the resulting filter cake and recycled for use in filtering additional quantities of molten coal.

The filtration passes the molten coal through a bed or mat of the filter aid. The recycled filter aid may here be used to form a new bed or mat for filtration of the molten coal.

Figure 1:
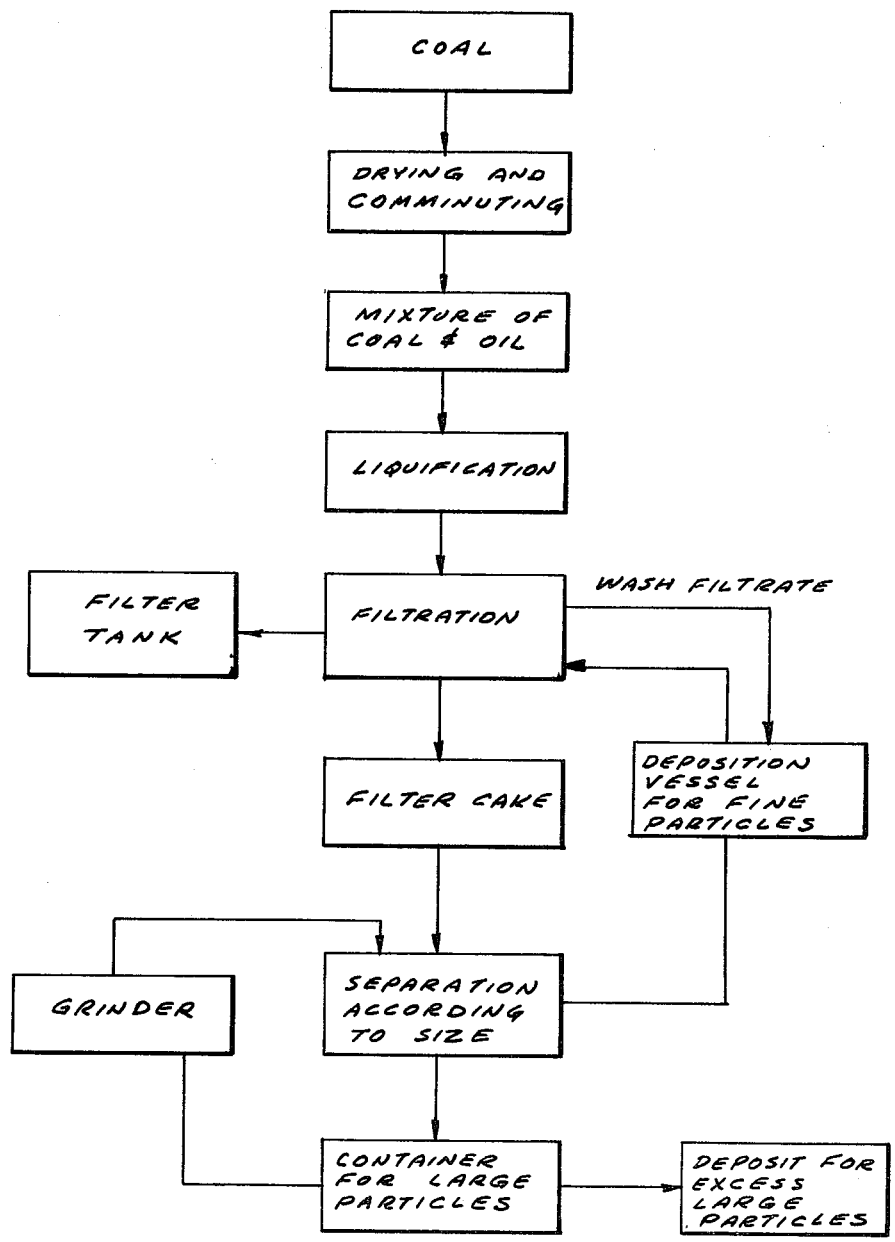
FIG. 1 schematically shows an embodiment of the inventive process in which fine solid particles of the coal mixture are recovered from the molten coal.
Figure 2:
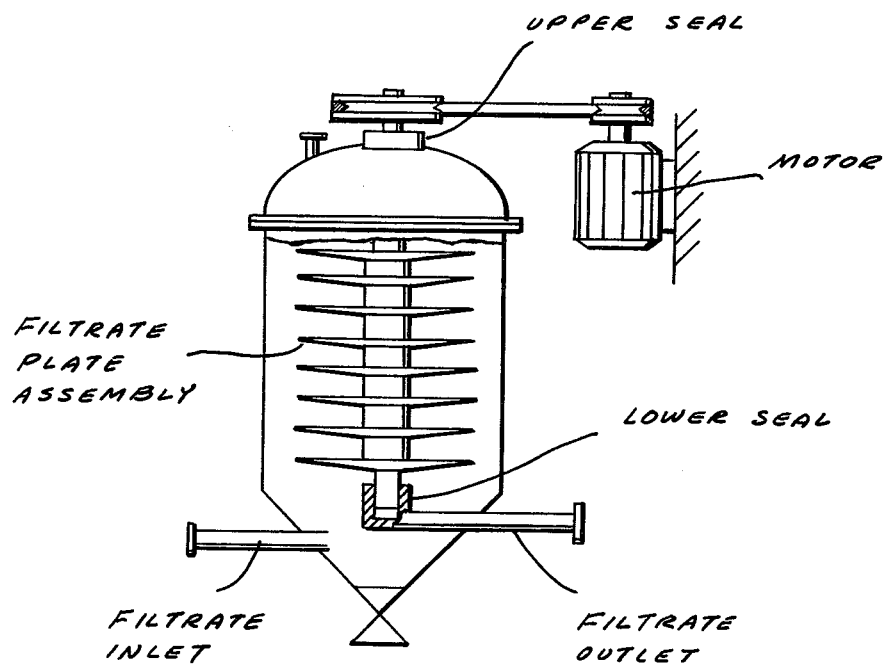
FIG. 2 shows a centrifugal discharge which is used to filter the molten coal.

Filtration of the molten coal takes place in a rotary disc filter also commonly known as a centrifugal discharge filter, the type of which is illustrated in FIG. 2. Such a filter is conventional according to the teachings of U.S. Pat. No. 3,395,801 and U.S. Pat. No. 3,233,734. The entire disclosure of these patents is hereby incorporated by reference into this disclosure.

As shown by FIG. 2, such a centrifugal discharge filter may be driven from the top by motor, leaving the bottom unobstructed for inlet and drainage lines.

Horizontal top-surface filter plates are mounted on a hollow motor—connected shaft that serves both as a filtrate-discharge manifold and as a drive shaft to permit centrifugal removal of the cake. The hollow shaft passes through the upper seal. During filtration, the filter vessel that coaxially contains the assembly of filter plates is filled with prefiltered molten coal under pressure. The filtrate passes through the plates and out the hollow shaft on which the plates are mounted. After filtration, the vessel is drained. The filter cake may be washed—or extracted, steamed, air-blown or dried by gas. It is discharged, wet or dry, by rotation of the shaft at sufficiently high speed to sling away the solids.

The operating advantages of the centrifugal-discharge filter are those of a horizontal-plate filter and, further, its ability to discharge filter cake without being opened.

The filter aid is in the form of fine particles. The filter cake recovered from a filtering operation will usually be a mixture of the fine particles with coarse or large particles. The mixture is classified, that is, the fine particles are separated, and the fine particles are recycled for use as a filter aid in the filtration of the molten coal. The large particles may be discarded.

Where necessary, the filter cake obtained from a filtering operation can be comminuted prior to the classifying operation. The comminution is preferably effected subsequent to drying of the filter cake.

In any event, the classified material, that is, the fine particles which have been separated from the large particles of the filter cake, may be directly re-used as a filter aid. This invention offers the possibility of producing the filter aid from the filtrant itself.

According to the invention, it is possible to separate the fine particles from the large particles in a sieving apparatus, that is, an apparatus with a screen or sieve area for the classification of a mixture of particles having different particle size. Thus, the comminuted filter cake may be conveyed onto a sieve or screen and separated into a coarse portion and a fine portion, for example. One form of sieving apparatus which may be used in accordance with the invention is that shown in FIG. 150 and described on page 282 of the fourth (1974) edition of the publication by Vauck/Muller entitled "Grundoperationen chemischer Verfahrenstechnik" and published by Theodor Steinkopff of Dresden, Germany.

Instead of using a sieve to separate the particles of the filter cake, the mixture of fine particles and large particles may be added to a pneumatic or air classifier for the purpose of separating the fine particles from the large particles. A pneumatic or air classifier separates dry, particulate matter into two particle size classes or ranges by means of a gas stream, such as air. According to the invention, the large particles may be discarded while the fine particles are added to the molten coal upstream of the filter, thereby acting as a filter aid. One form of pneumatic classifier which may be used in accordance with the invention is that shown in FIG. 265 (page 220) of the third edition (1974 edition) of the publication by Walter Wittensberger entitled "Chemische Betriebstechnik" and published by Springer of Vienna, Austria. A description of the operation of pneumatic classifiers may also be had from the publication starting on page 220. Pneumatic classifiers have the advantage that no dust forms during the process.

According to a particularly advantageous aspect of the invention, the molten coal is filtered in a centrifugal discharge filter using a filter aid and the resulting filter cake is dried with a chemically unreactive gas and then subjected to a centrifugal force in order to remove the filter cake from the discs of the centrifugal discharge filter. This aspect of the invention is characterized in that the thus-recovered filter cake is classified and the fine particles are again used as a filter aid while the large particles are discarded.

The fine particles which are recovered and resupplied to the stream of molten coal upstream of the centrifugal discharge filter may be 1. fine particles of slag recovered from the solid material originally contained within the stream of molten coal; or
2. fine particles of added compounds readily recoverable from the stream of molten coal, such as calcium oxide, magnetic metal granulates or inorganic salts; or
3. any combination of the above.

The fine particles used as the filter aid may consist, at least partially, of slag. This term embraces the incompletely defined mineral residue which remains solid following liquefication of other components of a coal mixture. Since the entire coal mixture is finely comminuted prior to immersion in an oil slurry, the size of the subsequently solid particles is generally scarcely larger than the size of the subsequently liquefied particles of the coal mixture.

Nitrogen may be used to dry the filter cake to a predetermined low moisture content of between about 0.5–3% by weight. The filter cake is then centrifugally removed from the filter plate and is classified. It may be preferable to mill the filter cake first to reduce agglomerations of particles. The classification of the fine particles of slag may be done by sieving them through a 100–250 micron mesh and discarding the larger particles which do not pass through. The fine particles may then be added directly to the stream of molten coal upstream of the centrifugal discharge filter.

To form the first filter cake, fine particles of extraneous compounds such as calcium oxide, inorganic salts or magnetic metal granulates may be added as filter aids. These fine particles may be separated along with the fine particles of slag in the first filter cake and both kinds of fine particles may be recycled through the stream of molten coal upstream of the centrifugal discharge filter.

The following Example is intended to further illustrate the invention as described above and is not to be construed as limiting the invention in any manner:

EXAMPLE 1

Molten coal containing solid material including slag is filtered in a centrifugal discharge filter using a filter aid. A filter cake is formed on each disc of the filter. After the filtration has ended, the filter cake is blown dry with nitrogen. Drying of the filter cake occurs very rapidly because the filter cake is warm since the molten coal has temperatures in the range of about 350° to 400° during the filtration. Since the filter cake is warm, the nitrogen need not be preheated. When drying of the filter cake has been completed, the plates of the centrifugal discharge filter are rotated. The resulting centrifugal force on the filter cake causes the cake to be thrown outwardly from the respective plate. The filter cake is subsequently removed from the filter vessel. The filter cake is deposited on a conveyor and transported to a sieving apparatus where the fine particles of slag are separated from the large particles of slag used as a filter aid, these particles being added to a stream of molten coal upstream of the filter.

Alternatively, it is possible, as mentioned earlier, to effect this separation in a pneumatic classifier.

According to a further embodiment of the invention, it is possible to use a magnetic material as a filter aid. Thus, fine granules of iron or nickel, which are magnetic, have been found to be suitable as filter aids for molten coal. Granules of magnetic material may be separated from the dry filter cake by means of a magnet, that is, by the application of a magnetic field to the mixture. As is the case for the first embodiment of the invention described above, the thus-recovered metallic filter aid may be directly re-used as a filter aid and, where appropriate, may be directly introduced into a bed of filter aid or may be directly used to form a new bed of filter aid.

Another method for recovering filter aids involves subjecting the dried filter cake to extraction with a solvent instead of using a sieving apparatus or pneumatic classifier.

Thus, it is possible, for example to use an inorganic salt as a filter aid and to dissolve out the inorganic salt from the filter cake by means of a suitable solvent. The inorganic salt may subsequently be recovered, for instance, by recrystallization, and re-used as a filter aid.

Since water is a convenient solvent, water-soluble inorganic salts are preferred as filter aids. When using a water-soluble salt as a filter aid, the impurity-laden or contaminant-laden filter cake is mixed with water while stirring. As a result, the water-soluble salt goes into solution. After a regeneration of the salt, which is dependent upon the nature of the salt used, the salt may again be used as a filter aid. The regeneration of the salt may, for instance, be effected by recrystallization and drying of the salt.

A method of regenerating salts which are used as filter aids will be further described with reference to the following Examples which are intended only to clarify the use of water-soluble, inorganic salts as filter aids and are not to be construed as limitative of the use of such salts as filter aids:

EXAMPLE 2

This Example relates to the use of calcium oxide (CaO) as a filter aid.

Molten coal is filtered using calcium oxide as a filter aid. After loading of the calcium oxide with solid matter from the molten coal, the filter cake resulting from the filtration is suspended in water. The calcium oxide transforms into an aqueous phase according to the following reaction:

$$CaO + H_2O \rightarrow Ca(OH)_2.$$

Waste gas which contains carbon dioxide ($CO_2$) is passed through the aqueous solution of calcium oxide and, as a result, calcium carbonate ($CaCO_3$) is obtained in accordance with the following reaction:

$$Ca(OH)_2 + CO_2 \rightarrow CaCO_3 + H_2O$$

The calcium carbonate ($CaCO_3$) may be transformed into calcium oxide (CaO), namely, the desired filter aid, by a combustion during which carbon dioxide ($CO_2$) is liberated. With this, the cycle is closed.

EXAMPLE 3

This Example relates to the use of sodium sulfate ($Na_2SO_4$) as a filter aid.

The filter cake obtained using sodium sulfate ($Na_2SO_4$) as a filter aid is suspended in water. As a result, the sodium sulfate ($Na_2SO_4$) goes into solution. After separation of the aqueous phase from the solid matter by decantation, the sodium sulfate ($Na_2SO_4$) is concentrated by evaporation and dried at temperatures in the range of 600° to 700° C. The thus-regenerated sodium sulfate ($Na_2SO_4$) may be re-used as a filter aid.

Additional inorganic salts which may be correspondingly treated and re-used as filter aids include the following:
Copper sulfate, $CuSO_4$
Sodium chloride, $NaCl$
Ferrous bromide, $FeBr_2$
Sodium metaborate, $NaBO_2$
Sodium silicate, $Na_2SiO_3$ By virtue of the closed cycle through which the salts are passed, the only losses in salt which need be compensated for are those occurring during the regeneration. Since the losses in salt may be held to relatively low values, it is possible to economically use even salts which are relatively expensive.

It will be appreciated that an important objective of the invention is always the recovery of the filter aid whether it be through separation of the coarse contaminant-containing particles from the filter aid by means of sieves; through separation of the coarse contaminant-containing particles from the filter aid by means of a gas stream in a pneumatic classifier; through separation of the coarse contaminant-containing particles from the filter means by magnetic means; or by reclamation of the filter aid from the filter cake by an extraction such as, for instance, dissolution in water and recovery by crystallization.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for filtering molten coal, comprising the steps of providing a filter vessel including a filter; contacting said filter with a filter aid comprising at least one member of the group consisting of inorganic salts, calcium oxide and magnetic metal granulates; passing a stream of molten coal which includes some solid material against said filter and filtering the solid material so as to form a filter cake on and to pass a filtrate through said filter; directing a spray or jet of chemically unreactive gas against said filter cake so as to dry the same to a predetermined low moisture content; centrifuging said dried filter cake off said filter; separating from the filter cake a fraction composed of fine particles of said filter aid; adding said separated fine particles of said filter aid to a stream of molten coal upstream of said filter; and passing said stream of molten coal and separated fine particles of said filter aid against said filter, whereby said fine particles act as a recycleable filter aid for the filtration of the molten coal.

2. The process of claim 1, further comprising the step of milling said dried filter cake prior to said step of separating.

3. The process of claim 1, further comprising adding fine particles of an extraneous compound which is a member selected from the group consisting of inorganic salts, calcium oxide and magnetic metal granulates prior to said step of passing only the stream of molten coal against said filter.

4. The process of claim 1, said step of passing and filtering being performed by contacting said filter with a body of molten coal under pressure.

5. The process of claim 1, said step of providing comprising utilizing a motor-connected shaft having an outer surface and a hollow interior and having at least one aperture passing through the outer surface to the hollow interior and mounting a porous filter plate defining a hollow interior on said hollow shaft in such a manner that the one aperture of said shaft communicates with the hollow interior of said filter plate; and further comprising the step of maintaining said hollow shaft stationary during the sequential steps of passing and filtering and directing; said step of centrifuging being performed by rotating said hollow shaft following said step of directing.

6. The process of claim 1, said step of separating being performed by sieving the particles of the filter cake.

7. The process of claim 1, said step of recovering being performed by pneumatically classifying particles of said filter cake.

8. The process of claim 1, said extraneous compound being a magnetic metal granulate, said step of recovering being performed by magnetically separating said extraneous compound from said filter cake.

9. The process of claim 1, said fine particles additionally comprising granules of residual mineral components not capable of being hydrogenated which are present in molten coal.

10. The process of claim 1, wherein said salt is selected from the group consisting of sodium sulfate, copper sulfate, sodium chloride, ferrous bromide, sodium metaborate, and sodium silicate.

11. The process of claim 1, said step of providing comprising providing a motor-connected shaft having an outer surface and a hollow interior and having at least one aperture passing through the outer surface to the hollow interior; mounting said filter plate on said hollow shaft in such a manner that the one aperture of said shaft communicates with the hollow interior of said filter plate; and further comprising maintaining said hollow shaft stationary during the sequential steps of passing and filtering and directing; said step of centrifuging being performed by rotating said hollow shaft following said step of directing.

* * * * *